United States Patent [19]

Field

[11] 4,441,794
[45] Apr. 10, 1984

[54] ADJUSTABLE SUN SCREEN FOR CAMERA LENS

[76] Inventor: Roger C. Field, Cincinnati Str. 41, 8000 Munich, Fed. Rep. of Germany

[21] Appl. No.: 289,482

[22] Filed: Aug. 3, 1981

[30] Foreign Application Priority Data

Aug. 4, 1980 [DE] Fed. Rep. of Germany ....... 8020870
Feb. 23, 1981 [DE] Fed. Rep. of Germany ....... 3106631

[51] Int. Cl.³ .............................................. G02B 7/22
[52] U.S. Cl. .................................................... 350/580
[58] Field of Search ......... 350/577, 580, 581, 276 SL, 350/448, 449; 354/287

[56] References Cited

U.S. PATENT DOCUMENTS

| 1,528,842 | 3/1926 | Mitchell | 350/581 |
| 1,991,814 | 2/1935 | Mitchell | 350/581 |
| 2,254,537 | 9/1941 | Nerwin | 350/580 X |
| 4,002,402 | 1/1977 | Mito | 350/580 |

FOREIGN PATENT DOCUMENTS

46-33495 10/1971 Japan ................................. 350/580
52-36023 3/1977 Japan ................................. 350/580

Primary Examiner—William L. Sikes
Assistant Examiner—Matthew W. Koren
Attorney, Agent, or Firm—Kerkam, Stowell, Kondracki & Clarke

[57] ABSTRACT

The present invention provides a screen for limiting the amount of light entering a camera lens through a sunshade. To this end, a camera which may be a film or video camera with interchangeable or fixed focal length lenses or interchangeable or fixed zoom lenses and which includes a sunshade having a fixed opening mounted to the lens is provided with an axially adjustable mask within the sunshade. The mask may be mounted at either the front or the rear opening of a bellows which is of the accordion-type. Positioning of the mask may be through a gear mechanism including a rack extending through an opening in the sunshade or may be through a slide mechanism external of the sunshade and passing internally thereof through a light sealed slot.

29 Claims, 8 Drawing Figures

ADJUSTABLE SUN SCREEN FOR CAMERA LENS

BACKGROUND OF THE INVENTION

1. Field of the Invention

The present invention relates to cameras and in particular to cameras having a fixed focal length or zoom lens, and to interchangeable lenses of fixed focal length or zoom lenses which are provided with optimal light protection for a variety of focal lengths by means of an axially adjustable screen.

2. Description of the Prior Art

It is known that sunshades are made to cover short focal lengths, that is, they allow an opening, i.e., field of view, of for example 65°. With long focal length lenses with a light entry angle of for example 7° these fixed sunshades have a limited effect.

It is further known that in order to achieve a light screening effect under for example 65°, masks can be placed on the tube-shaped sunshade, which screen the light entry as well as possible. Slots are provided in the sunshade in which a mask can be placed. Such an arrangement is not only complicated to handle, but also inaccurate, since the masks can only be set for fixed focal lengths, and are therefore impractical for zoom lenses or lenses of different focal lengths, since a mask designed for each specific focal length would be needed for each corresponding lens.

It is also known that manually adjustable bellows matt-boxes are used for, for example, super 8 or 16 or 35 mm cinecameras. In such arrangements, the sunshade consists in this case of a collapsible folded bellows which tapers towards the lens, and which will accept masks on its front end. Such bellows units with masks can be adjusted to any focal length and typically have a fixed, rectangular frame on the front of the bellows. In the telephoto position the bellows cannot for practical reasons relating to size be made long enough to provide adequate light protection. Because of this the frame in front of the bellows is constructed to accept an additional mask or masks.

It is furthermore known that an adjustable sunshade can be used where four adjustable doors are attached to the front of the sunshade which can be adjusted in pairs. However, the doors are obviously geometrically limited in their light protection.

SUMMARY OF THE INVENTION

The invention provides a solution to the task of providing optimal light protection for a variety of focal lengths quickly and easily in a compact unit. To this end, a mask is positioned within the camera sunshade and in front of the lens and is axially adjustable according to the focal length of the lens to limit the amount of light entering the lens, i.e., to limit the field of view. The mask can be rectangular, with a rectangular opening which has dimensions permitting sufficient light screening for a variety of focal lengths. If a rectangular mask is used, a tube-shaped sunshade with a rectangular cross-section of approximately the same size as the mask is used, and the mask can travel approximately the whole length of the sunshade.

In the extreme wide angle position, that is in the position near the lens, space may be provided for placing filters between the lens and the mask.

If a sunshade is used which tapers towards the lens, the mask, if it is about the same size as the largest cross-section of the sunshade, obviously cannot travel inside the sunshade. In this case, the mask can be attached to the front or rear of the sunshade via a collapsible bellows. The size of the mask is made to correspond to the size needed in the wide angle position near the lens, then the light entry in the telephoto position, that is in the front position of the sunshade, is prevented by a bellows. The bellows may be attached to the lens and the rear of the sunshade, so that the sunshade and the mask move together. The bellows may be made of leather, rubber, fabric or similar material and be foldable in accordion-style.

In cameras having a zoom lens, the mask may be positioned by the zoom actuating mechanism via mechanical means including gearing, linkages and/or cables or belts. Alternatively the electrical actuating means, such as a motor or motors mechanically connected to the mask, may be utilized to position the mask. Such methods of positioning or moving the mask can also be used on cameras with interchangeable zoom or fixed focal length lenses. In any event, it is also possible to adjust the mask manually relative to the lens focal length. Ideally, the mask is moved so that it is slightly outside of the picture format visible in the viewfinder.

In accordance with one alternative embodiment of the invention, the bellows is made out of strips which overlap at their edges, and which shield the lens from light and functions as a special mask. It is also possible to make the sunshade itself a bellows.

It is also possible for the front or rear opening of the bellows to act as the mask whereby a rigid frame may be used to support the bellows opening.

In the embodiment wherein the sunshade tapers towards the lens, the bellows can consist of four pieces or portions overlapping at the edges. It is possible to use just two pieces, left and right, if the light is otherwise sufficiently shielded on top and bottom, and if the sunshade has constant height and only tapers in width towards the lens. Likewise, the sunshade may taper on top and bottom towards the lens with the sides being parallel. Strips of the sort described above may be used by having one strip on top of the mask and one beneath the mask. The arrangement of sunshade and mask can be used for all cameras with interchangeable lenses of fixed focal length or interchangeable or fixed zoom lenses.

Since the focussing ring on most lenses not only turns but moves forward and backward as well, in accordance with another embodiment of the invention, a cylindrical ring is attached to the rear of the sunshade and fits over the focussing ring and shields the lens from light, no matter in what position the focussing ring is set. Space can be left between the front of the ring and the rear of the sunshade for a filter or filters.

BRIEF DESCRIPTION OF THE DRAWING

The invention and its attendant advantages will be more readily apparent and appreciated from the following detailed description taken in conjunction with the following drawings in which:

In FIG. 4 the bellows is shown attached to the front end of the sunshade and in FIG. 5 the bellows is shown attached to the back end of the sunshade;

DESCRIPTION OF THE PREFERRED EMBODIMENTS

Figure 1:
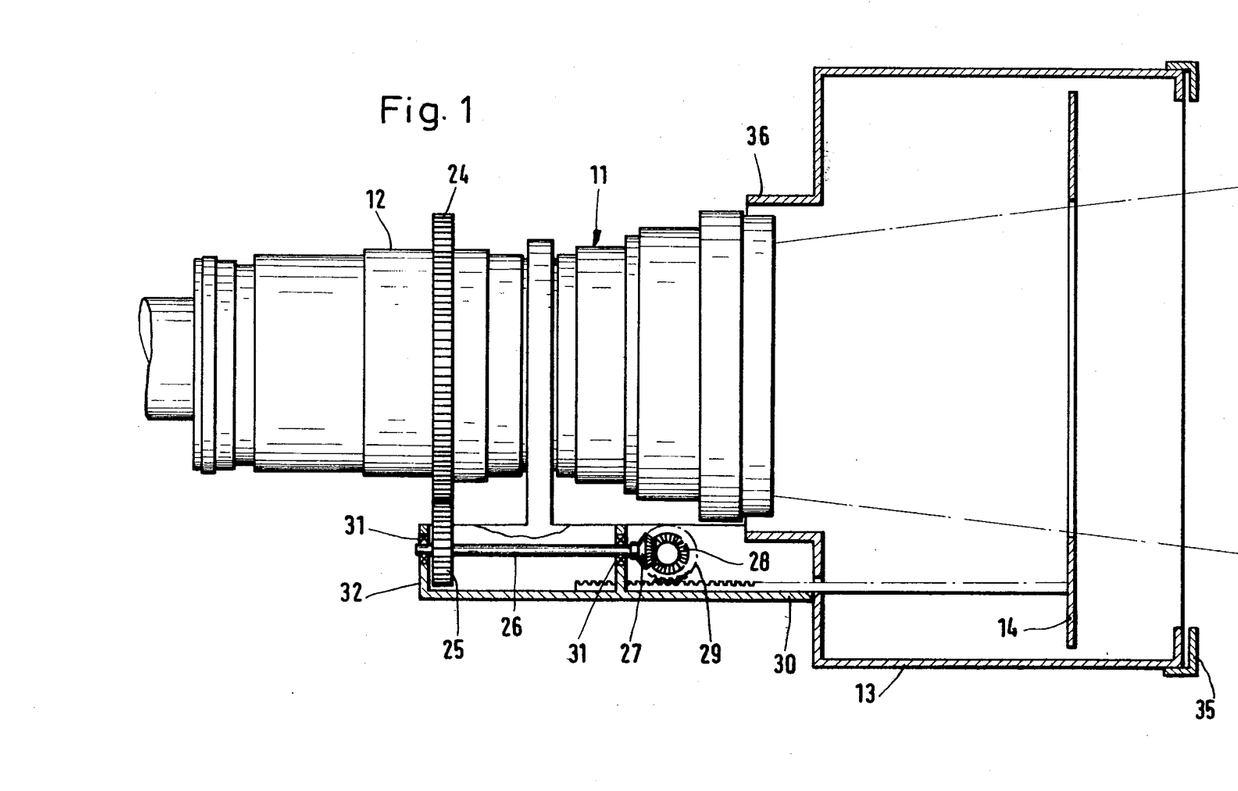
FIG. 1 shows a fragmentary side view of a camera zoom lens with a sunshade with an axially movable mask adjusted by a gear mechanism.

Referring now to the drawings, and in particular to FIG. 1, there is illustrated the zoom lens 11 of a camera, which may be, for example, a conventional film or video camera to which the zoom lens is mounted. To this end, the zoom lens 11 can be either a fixed or an interchangeable lens. The zoom lens 11 has a zoom actuating ring 12 and a sunshade 13 fixed to its front. An axially movable mask 14 is situated inside the sunshade 13 and is operatively connected to the zoom actuating ring 12 via a gear train for axial movement within the sunshade upon rotation of the zoom actuating ring 12.

The gear train consists of a toothed ring 24 which is immovably attached to the zoom actuating ring 12. The toothed ring 24 meshes with a gear 25 fixedly supported on a rod 26. A bevel gear 27 is fixedly supported at one end of rod 26 and meshes with another bevel gear 28 rotatably supported on a shaft disposed transverse to rod 26. Gear 28 is immovably attached to a gear 29 likewise mounted on the shaft and which meshes with an axially located rack 30. Rack 30 extends through an opening provided in the rear or a side of the sunshade and is in turn attached at one end to mask 14. Rod 26 is held by bushings or bearings 31 in an assembly 32 which is firmly attached to lens 11.

Mask 14 is movable or positionable inside the sunshade 13 by turning the zoom actuating ring 12, which in turn rotates gears 25 and 27, the latter turning gears 28 and 29 to effect axial displacement of rack 30. The sunshade 13 has a ring 36 attached to its rear or back side, as viewed in the drawing which slides over the focussing portion of the lens 11 and prevents light from entering the lens when the focussing ring on the lens is actuated.

Figure 2:
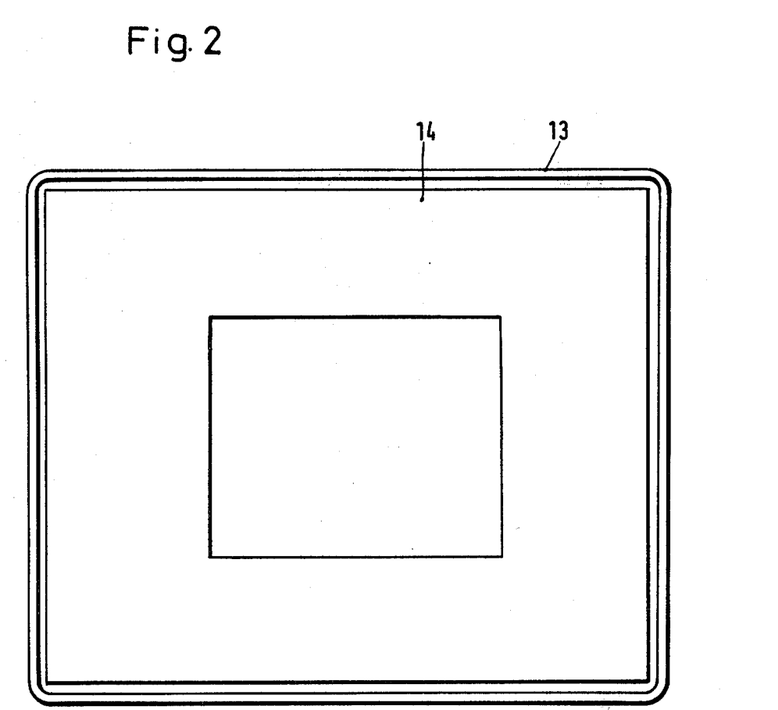
FIG. 2 shows a front view of the lens in FIG. 1.

FIG. 2 shows a front view of the lens in FIG. 1, but in FIG. 2 the sunshade 13 has a rectangular cross-section and the mask 14 is accordingly rectangular in shape with a rectangular opening, as contrasted with a tubular or cylindrical shape as shown in FIG. 1, for example, which would in that event preferably include a tubular mask.

Rails 35 can be provided on the front end of the sunshade 13 so that a special effects mask may be added.

Figure 3:
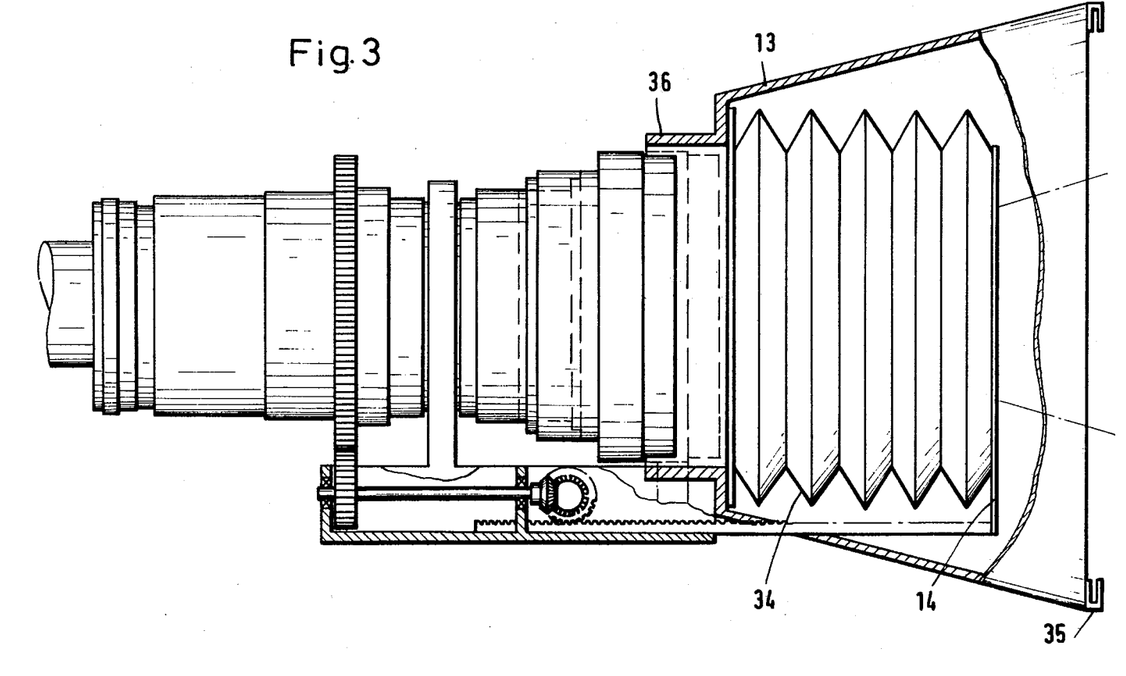
FIGS. 3, 4 and 5 show side views of alternate embodiments of the sunshade and mask, where the mask is attached to an accordion-type bellows.

FIG. 3 shows another embodiment of the invention wherein the mask 14 is attached to the front end of an accordion-like bellows 34. The rear end of the bellows is attached to the rear of the sunshade. The sunshade is larger at the front end and tapers towards the lens. A ring 36 connected at the rear end of the sunshade can be slid over the outer focussing ring to mount the sunshade thereon and prevent stray light from entering the lens.

It will be apparent in this and other embodiments that the details of the zoom lens and mask actuating gear train are substantially identical. Accordingly, a repetition of these details hardly seems necessary and will not be given, other than to note that the rack 30 conveniently passes through the side wall of the shade 13 and not the back wall as in FIG. 1. Likewise it will be apparent that the camera to which the lens and associated shade and mask are mounted has not been shown because the inventive features reside in the accessory elements and not the camera.

Figure 4:
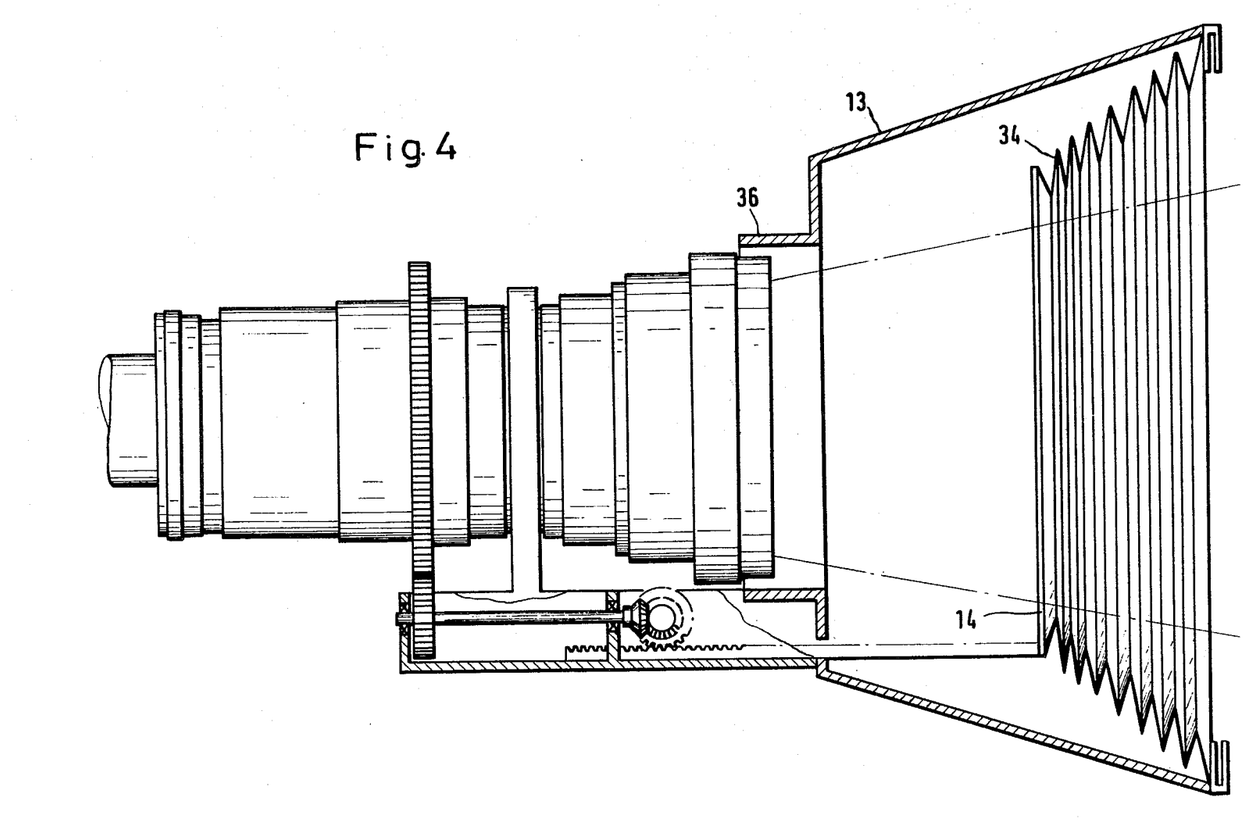

FIG. 4 shows a variation of the embodiment shown in FIG. 3 wherein the mask 14 is attached to the rear of the bellows 34 internal to the shade 13. The front end of the bellows is rigidly attached to the front end of the sunshade. Thus, the field of view is limited by the mask and no light is permitted to enter the lens from the area around the mask, which might be the case in the embodiment of FIG. 1.

Figure 5:
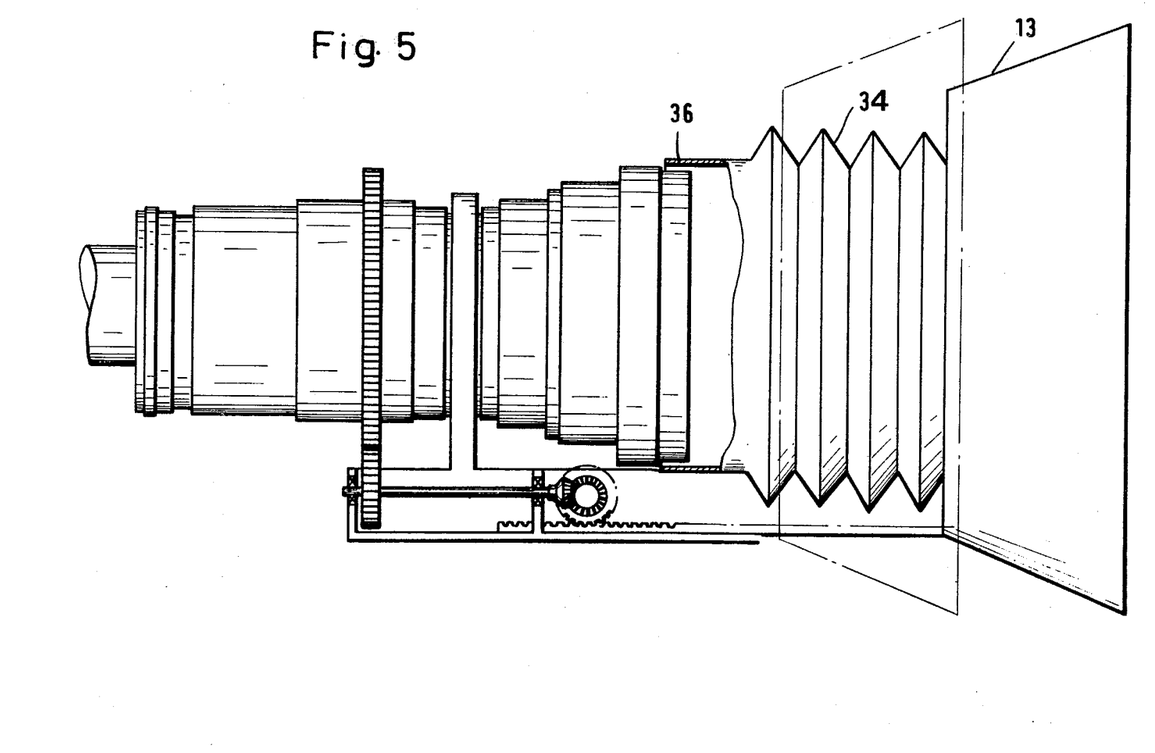

FIG. 5 shows another embodiment of the invention where the bellows 34 is attached at one end to a covering ring 36 which is in turn attached to the lens.

The other end of the bellows 34 has the mask 14 attached to its front end and this mask in turn is fixed to the rear of the sunshade 13, which is axially movable along with the mask 14 by the aforedescribed gear train mechanism. In this embodiment, a mask element itself may be deleted because the rear of the sunshade which borders the opening into the bellows acts as the mask.

The size of the mask opening (FIG. 2) of mask 14 can be changed for example by situating two or more blinds inside the sunshade 13 which are actuated by the axial movement of the mask 14. These blinds can also be placed in front of the mask and attached to the front of the sunshade. The blinds may be hinged so that when the mask 14 is pushed forward the blinds are closed to provide the smallest possible opening.

Figure 6:
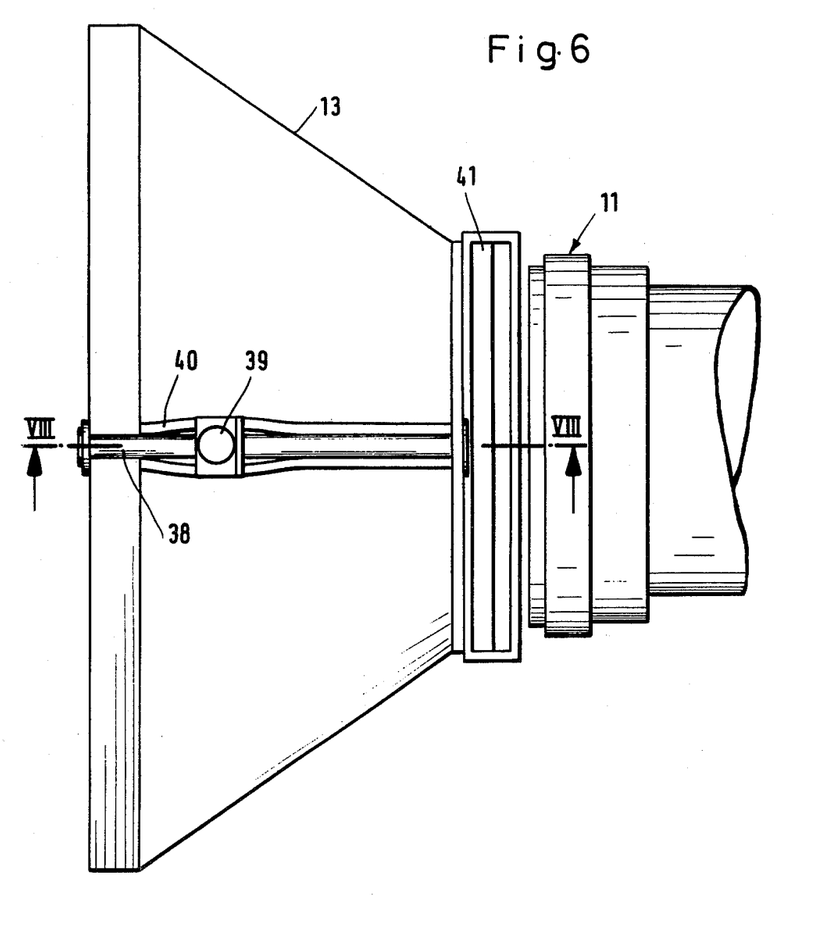
FIG. 6 shows a top view of a further embodiment, wherein a mechanism is provided so that the mask can be adjusted by hand.
Figure 7:
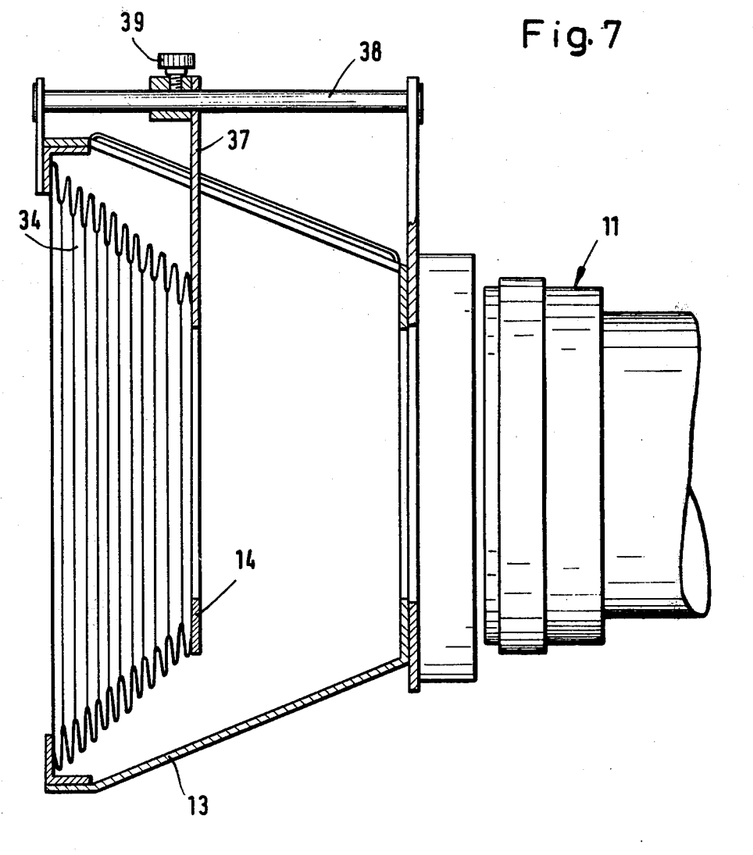
FIG. 7 shows a section taken along line VIII—VIII in FIG. 6.

FIGS. 6 and 7 illustrate the preferred embodiment of the invention wherein the mask 14 is manually adjustable. The mask 14 is connected via a bellows to the front of the sunshade 13 as in the embodiment in FIG. 4, the mask 14 itself being mounted at the rear of the bellows. The mask has also connected thereto a support 37, which extends outwardly through the sunshade and which is slidable along an axially located rod 38. Rod 38 is firmly connected to the sunshade 13 by supports. The mask 14 can be slidingly fixed to rod 38 by a screw knot 39 in any desired position along the rod 38, its position setting the corresponding placement of the mask 14 within the sunshade. Support 37 passes through a slot in sunshade 13. This slot is sealed by a double rubber seal 40, where both halves overlap to prevent light from entering but to allow axial positioning of support 37 and the associated mask.

Figure 8:
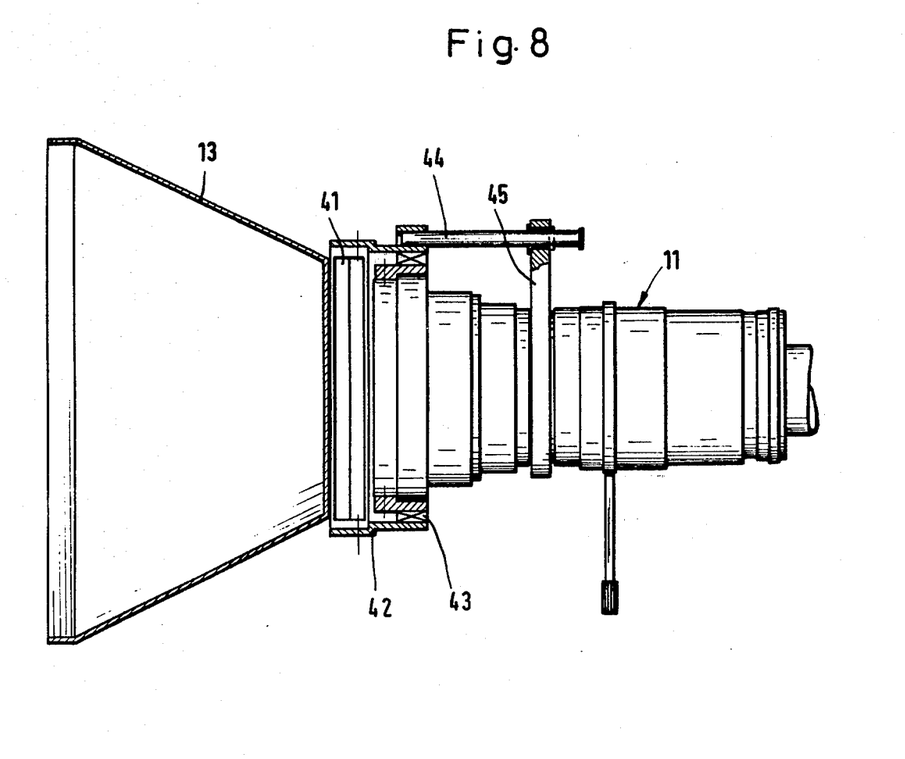
FIG. 8 shows a side view of a further embodiment of the present invention.

FIG. 8 shows a preferred embodiment of the invention where the sunshade 13 and the mask are attached to the front focussing ring of the zoom lens via ring 42 and ball bearing 43. This focussing ring on the lens turns and slides axially. Ring 42 has attached thereto one end of an axially located rod 44 which is guided through a support 45 fixed to the lens. When the focus ring of the lens is activated, the sunshade assembly only moves axially, since the rotation of the focussing ring of the lens 11 is not transmitted through ball bearing 43. Suitable filters 41 may be positioned in front of the lens at the rear of the sunshade, whose distance from the lens 11 remains constant. In a variation of the embodiment shown in FIG. 8, rod 44 may alternatively be axially guided along ring 42 and firmly attached to support 45.

While the invention has been described and illustrated in connection with certain preferred structural embodiments, it will be apparent to those skilled in the art that modifications thereto which fall within the true spirit of the invention can readily be made. Accordingly, it is intended by the appended claims to cover all such embodiments and reference should be made to the appended claims to determine the full scope of the invention.

I claim:

1. In a camera having a lens adapted to be mounted thereto and including a rigid sunshade mounted thereon having a fixed field of view to restrict the angle of light entry to said lens, the improvement comprising a mask disposed within the sunshade for screening light, and means for supporting said mask in a position in front of the lens and within the sunshade, said means for supporting said mask including means for axially adjusting the position of the mask relative to and within the sunshade in accordance with the focal length of the lens so as to limit the field of view of the lens through the sunshade.

2. In a camera as set forth in claim 1 wherein the lens is a zoom lens and the means for axially adjusting the position of the mask includes a gear mechanism coupling the mask to the zoom lens.

3. In a camera as set forth in claims 1 or 2 wherein said mask includes a cut-out.

4. In a camera as set forth in claim 2 wherein said zoom lens includes a zoom lens lens adjusting ring (12) and a gear ring (24) permanently fixed to the zoom adjusting ring (12) of the zoom lens (11), and said gear mechanism comprising a first gear (25) arranged to mesh with said gear ring (24), a first bevel gear (27), a shaft (26) connecting said first bevel gear to said first gear (25), a second bevel gear (28), said second bevel gear being arranged to mesh with first bevel gear and being permanently attached to a second gear (29), a rack (30) mounted to mesh with said second gear and means for attaching the mask (14) to one end of said rack.

5. A camera as set forth in claim 1 wherein said lens includes a rotating part and a non-rotating part, said means for supporting said mask including a collapsable bellows (34) attached by way of the adjusting means to the non-rotating part of the lens or the camera, and directly to the sunshade (13).

6. In a camera having a zoom lens adapted to be mounted thereto and including a sunshade on said zoom lens having a fixed opening to restrict the angle of light entry to said zoom lens the improvement comprising a mask (14) for screening light, means for supporting said mask in a position in front of the lens and within the sunshade, said means for supporting said mask including a gear mechanism coupling the mask to the zoom lens for axially adjusting the position of the mask in accordance with the focal length of the zoom lens so as to limit the amount of light entering the lens through the sunshade, said zoom lens including an adjusting ring (12) and a gear ring (24) permanently fixed to the zoom lens (11) and said gear mechanism comprising a first gear (25) arranged to mesh with said gear ring (24), a first bevel gear (27), a shaft (26) connecting said first bevel gear to said first gear (25), a second bevel gear (28) being arranged to mesh with said first bevel gear and being permanently attached to a second gear (29), a rack (30) mounted to mesh with said second gear, means for attaching the mask (14) to one end of said rack, said zoom lens including a rotating part and a non-rotating part, and said means for supporting said mask including a collapsable bellows (34) attached at one end to the non-rotating part of the zoom lens (11) and at its other end to the sunshade (13).

7. A camera as set forth in claim 5 or 6 wherein the bellows is foldable.

8. A camera as set forth in claim 1 wherein said sunshade is attached to the camera, in front of the lens.

9. A camera as set forth in claims 5 or 6 wherein the bellows is disposed to surround at least part of the light field established by the sunshade fixed opening.

10. A camera as set forth in claim 9 wherein said sunshade is of a constant first sunshade dimension and said mask has a first mask dimension approximately equal to the first sunshade dimension.

11. A camera as set forth in claim 9 wherein the bellows consist of overlapping segments.

12. A camera as set forth in claims 5 or 6 wherein the sunshade and the bellows taper conically toward the lens.

13. A camera as set forth in claim 5 or 6 wherein the mask is mounted at the front of the bellows.

14. A camera as set forth in claims 5 or 6 wherein the mask is mounted at the rear of the bellows and the front end of the bellows is attached to the front of the sunshade.

15. A camera as set forth in claims 5 or 6 including a ring (36) positioned over the focussing ring of the lens (11) which prevents stray light from entering the lens.

16. A camera as set forth in claim 1 wherein said means for axially adjusting the position of the mask includes a motor.

17. A camera as set forth in claim 1 further including rails (35) on the front of the sunshade (13) for attaching a special effects mask.

18. A camera as set forth in claim 1 wherein the sunshade is collapsable.

19. A camera as set forth in claim 1 wherein the sunshade and the mask are mounted to swing away from the lens.

20. A camera as set forth in claim 1 further including a space provided between an extreme wide angle viewing position of the mask and the lens adapted to receive at least one filter, said extreme wide angle viewing position corresponding to the position of the mask when it is positioned in its furtherest movable position closest to the lens.

21. A camera as set forth in claim 1 wherein the mask is removably mounted so as to be interchangeable.

22. A camera as set forth in claim 1 wherein the sunshade includes means for attaching a special effects mask thereto.

23. A camera as set forth in claim 5 wherein the means for supporting the mask includes at least one rigid support (37) attached to at least one axially positioned beam (38), the support being manually slidable along said beam and screw knob means (39) for fixing said support in any desired position along said beam.

24. A camera as set forth in claim 23 wherein the sunshade includes an axial slot and said support (37) is disposed to pass through said slot in the sunshade and further including means for shielding the slot against light.

25. A camera as set forth in claim 24 wherein the means for shielding the slot is a rubber shield through which the rigid support extends.

26. A camera as set forth in claim 5 wherein the lens includes a focussing ring and a mounting ring (42) at the front of the lens, the sunshade and the mask positioned therein being attached to the focussing ring of the lens by the means of said mounting ring (42), said mounting ring being supported on said lens by a ball bearing support (43), and further including a support assembly (44, 45) for axially slidably supporting said mounting ring.

27. A camera as set forth in claim 26 including at least one axially positioned rod (44) slidably held in the support assembly (45) and being connected to a fixed portion of the lens.

28. A camera as set forth in claims 5 or 6 wherein sunshade and bellows taper toward the lens.

29. A camera as set forth in claim 9, wherein said sunshade tapers towards the lens and said bellows includes at least two light-blocking portions attached between the mask and the sunshade.

* * * * *